(No Model.) 3 Sheets—Sheet 2.
G. J. ANDERSSON & J. C. DITTRICH.
PROCESS OF MANUFACTURING OZONE AND BY-PRODUCTS.
No. 577,523. Patented Feb. 23, 1897.
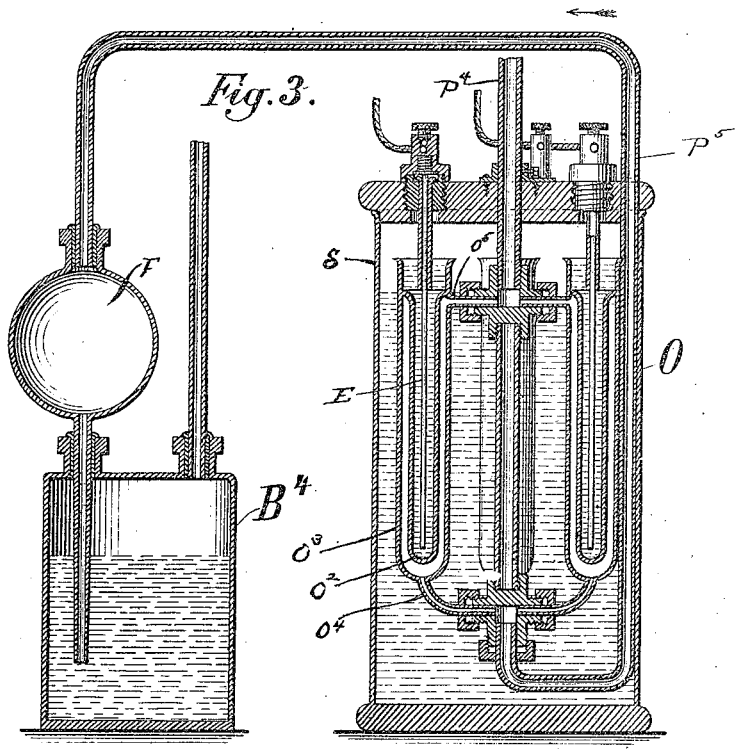
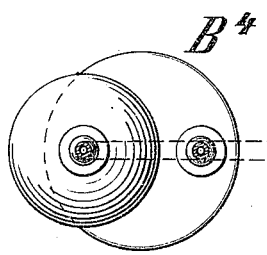
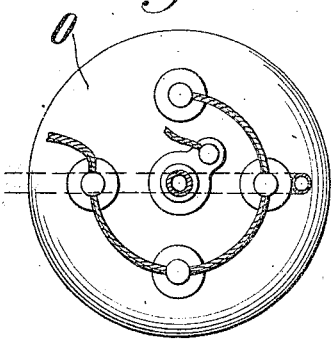
Witnesses:
Fr. Nemo Roehrich.
B. van Herff
Inventors:
Gustaf Johann Andersson
Julius Carl Dittrich
By L. K. Böhm, Attorney.

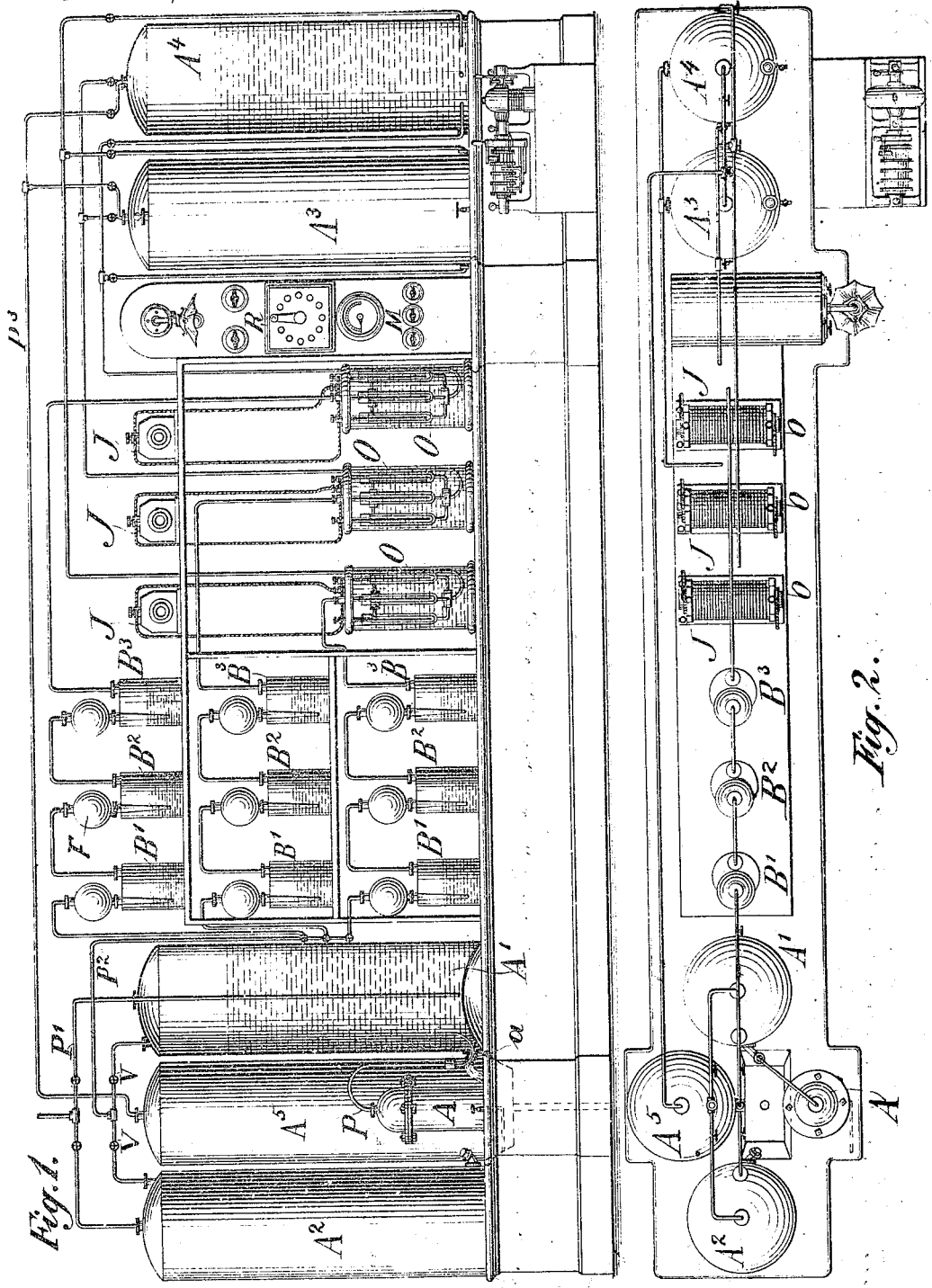

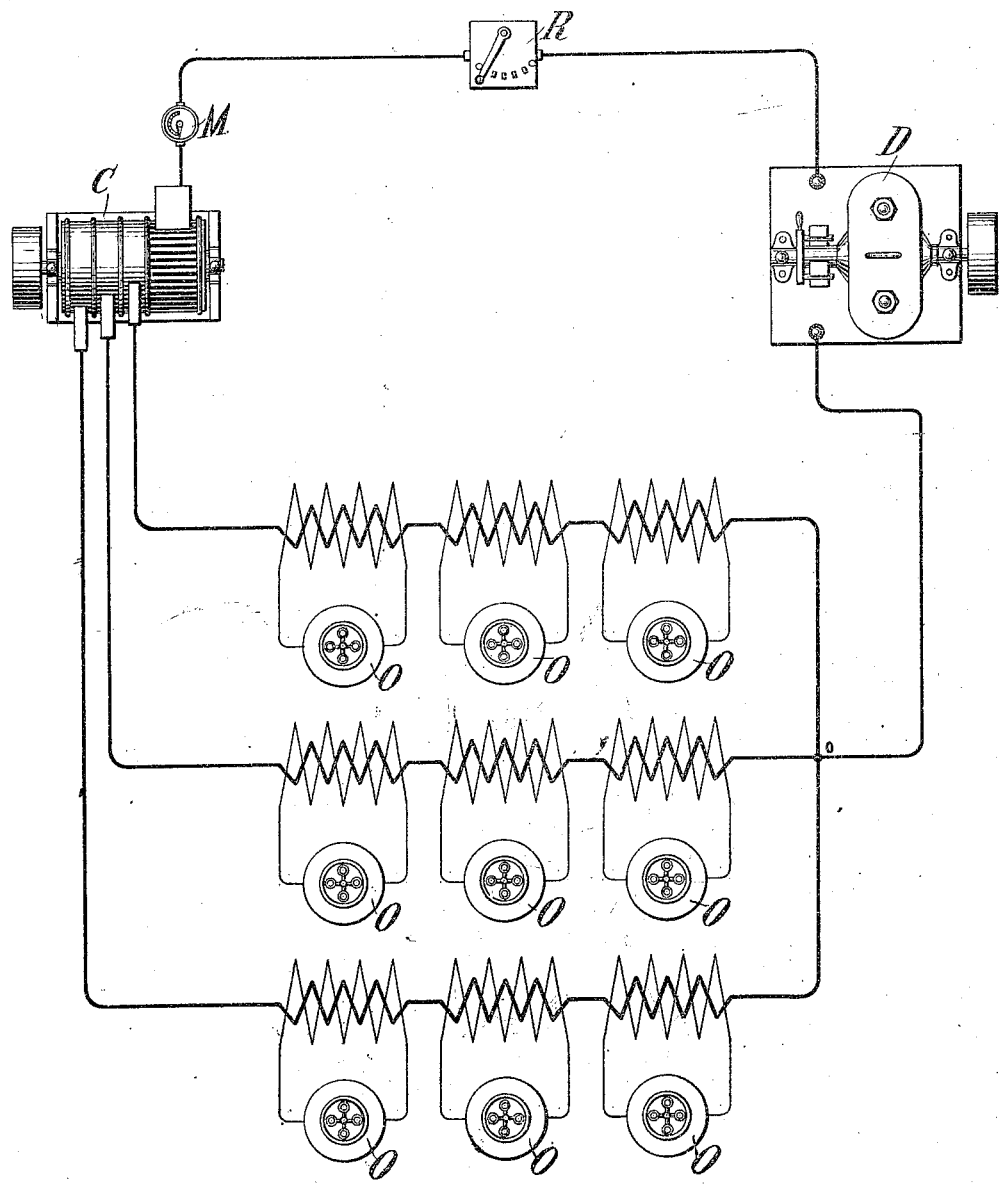

UNITED STATES PATENT OFFICE.

GUSTAF JOHANN ANDERSSON AND JULIUS CARL DITTRICH, OF BROOKLYN, NEW YORK, ASSIGNORS TO THE OZONE COMPANY, OF SAME PLACE AND NEW YORK, N. Y.

PROCESS OF MANUFACTURING OZONE AND BY-PRODUCTS.

SPECIFICATION forming part of Letters Patent No. 577,523, dated February 23, 1897.

Application filed December 12, 1894. Serial No. 531,580. (No model.)

*To all whom it may concern:*

Be it known that we, GUSTAF JOHANN ANDERSSON, a subject of the King of Sweden and Norway, and JULIUS CARL DITTRICH, a subject of the Emperor of Germany, residing in Brooklyn, in the county of Kings and State of New York, have invented certain new and useful Improvements in the Manufacture of Ozone and By-Products; and we do hereby declare that the following is a full, clear, and exact specification thereof.

Our invention relates to improvements in an ozone plant for the manufacture of ozone in large quantities for commercial purposes. It has further special reference to the manufacture of by-products obtained from the nitrogen of the air, as will be fully described farther down.

In the accompanying drawings, Figure 1 represents a side elevation of an ozone plant. Fig. 2 is a top plan view of Fig. 1. Fig. 3 is a vertical section of an ozone-generator connected with an apparatus for collecting the by-products. Fig. 4 is a top plan view of the apparatus for collecting the by-products. Fig. 5 is a top view of the ozone-generator, and Fig. 6 is the electrical diagram for the plant.

Similar letters of reference indicate corresponding parts in all the drawings.

Ozone, as is well known, is an allotropic modification of oxygen. The common oxygen contains two atoms of oxygen ($O_2$) to the molecule, while ozone contains three, ($O_3$.) This third atom of oxygen is rather loosely combined with the two others and is the so-called "active" oxygen, giving to ozone the great active power by which it is distinguished from the ordinary oxygen. This third atom is easily given off in the presence of oxidizable substances and acts then *in statu nascendi* more powerful than ordinary oxygen. The transformation of oxygen into ozone for commercial purposes is effected by the silent electric discharge of high-tension currents. We use, generally, currents of from eight to fourteen thousand volts. Not all the oxygen can, however, be transformed into ozone. Only a portion of it is transformed.

Ozone may be made from pure oxygen or from the common air. If made from pure oxygen, then the same is generated by any of the well-known cheap and reliable chemical methods, for instance, from chlorate of potassium and manganese dioxid. It is plainly understood that only ozone results and no by-products when pure oxygen is ozonized. If air is employed for making the ozone, then the oxygen of the air is ozonized and the nitrogen of the same is transformed into nitrous compounds. Thus both ozone and by-products are obtained. For technical purposes the air is generally ozonized on account of its cheapness. For medical preparations, however, pure oxygen is used because a purer product is then required. The air has to be freed from carbon dioxid and moisture before it enters the ozone-generator, and both air and oxygen have to be under pressure, so that a steady current of them can be passed through the ozone-generators.

The oxygen is generated in the retort A, Figs. 1 and 2. From there it goes through the pipe P into the cylinder A'. When the process is started, cylinder A' is full of water, and the gas bubbles through the water and forces the same out through the small outlet $a$, according to the quantity of gas collected in the cylinder. The cylinder A' thus acts as a gasometer. When the cylinder A' is nearly filled with oxygen, then the small pipe P is taken out and a cap is put on the opening of the outlet $a$, thus closing it. Now water is let in through the water-pipe P', thus putting the oxygen under pressure. The cylinder A² answers the same purpose as the cylinder A. It is generally filled while A' is discharged. After the cylinders are filled with oxygen one or both of the valves V are opened, when the gas will pass through the pipe P², which branches out into three pipes. Through these pipes the oxygen passes into the wash-bottles B' B² B³, which are arranged in a series, so that the gas passes each successively. Bottle B' contains a solution of caustic alkali, which retains the traces of carbon dioxid. Bottle B² is charged with hyposulfite of sodium, which absorbs the chlorin, and B³ contains sulfuric acid, which retains the moisture. The thus purified and dried oxygen is conducted into the ozone-generators, of which three are illustrated in Figs. 1 and 2, where it is ozonized by the high-tension current. From these generators the ozone passes into the cylinders or tanks $A^3 A^4$, containing various liquids which are to be charged with ozone, that is, they absorb the same. Such liquids are, for instance, distilled and sterilized water prepared for medical purposes, or the cylinders may be filled with vegetable or mineral oils or fats. The ozone enters the tanks $A^3 A^4$ at the bottom, so as to come in contact with a high volume of the substances to be ozonized. When saturated with ozone, these substances are bottled, when they will be ready for sale. An excess of ozone is always passed through these substances, so as to insure saturation to their utmost capacity. The ozone which is not absorbed by the substances is conducted through pipe $P^3$ into the cylinder $A^5$, Fig. 1, where it is collected. When $A^5$ is filled, then the ozone is put under pressure by water, as described, and the ozone is used again for absorption, cylinder $A^5$ being simply put in place of cylinder $A'$ or $A^2$.

When purified and dried air is used, then the high-tension current transforms the oxygen of the air into ozone, and the nitrogen is transformed into nitrous compounds. In order to eliminate these compounds from the ozone, the mixture, after leaving the ozone-generator, is passed through a bottle, Fig. 3, which contains a solution of caustic alkali, forming nitrite or nitrate of alkali. Such bottles may also be filled with water. Then the nitrous compounds will form nitric acid. The nitrites or nitrates are then purified and crystallized, or the nitric acid is concentrated, as may be required. All parts of these bottles are interchangeable, and the big safety-bulb F above the bottle proper is there for the purpose of keeping the liquid back from the piping when in case of unforeseen circumstances the liquid rises.

The electricity for the plant is generated by a continuous-current dynamo D, Fig. 6. The current is conducted first into a regulating-rheostat R, and then passes the measuring instruments, of which one (marked M) is shown in Fig. 6. Then the current enters the interrupter C. We use the electrical interrupter, run by mechanical power, for which United States Letters Patent No. 537,595 was granted to G. J. Andersson, April 16, 1895. From the electrical interrupter the current is taken off in any suitable number of circuits. Three are illustrated in Fig. 6. Each of these three circuits leads to the primary coil of an induction-coil. The circuits unite at $o$ and return to the dynamo by a single wire. In the secondary windings of the induction-coils is induced the high-tension current, which is conducted into the ozone-generators, where the oxygen is transformed into ozone and the nitrogen into nitrous compounds.

The induction-coils are constructed like ordinary Ruhmkorff coils, but have no interrupters. The current is interrupted before it enters the induction-coils in any suitable manner.

The ozone-generator, which is shown in detail in Fig. 3, consists of a number of any style of the well-known ozone-tubes $O'$. They are mounted in one big glass jar S and form a battery. The jar illustrated in Figs. 3 and 5 contains four such tubes. The tubes consist of two parallel tubes of thin glass, forming two separate spaces. The outside tube is provided with a connecting-tube $O^4$ at the bottom and a side tube $O^5$ in the upper portion. Four tubes are combined in the manner shown in Fig. 3, so that the purified air or oxygen which enters through pipe $P^4$ communicates with all four tubes and leaves, when ozonized, through the one pipe $P^5$. The inner tube $O^2$ is filled with water, into which dips an electrode E. The space between the outside and inside tube is the portion traversed by purified air or oxygen. The electrical connections are shown in Fig. 5. The high-tension current entering through the electrodes E passes silently through the glass walls and the space between them where the oxygen or air passes through, ozonizing them in the well-known manner.

Having thus described our invention, what we claim therein as new, and desire to secure by Letters Patent, is—

1. The process of manufacturing ozone and nitrous oxids from air consisting in first freeing the air from carbon dioxid and then drying the same, then ozonizing the oxygen of the air into ozone and oxidizing simultaneously the nitrogen of the same into nitrous oxids by electrical currents of high tension in an ozone-generator and then separating the nitrous oxids from the ozone by absorbing them in suitable liquids, substantially as described.

2. A plant for manufacturing ozone and by-products consisting of a dynamo, a rheostat, a mechanical current-interrupting device, induction-coils, cylinder-reservoirs gas wash and drying bottles in connection with the reservoirs, ozone-generators in connection with the drying-bottles and in the secondary circuits of the induction-coils, apparatuses for separating and collecting the by-products in connection with the ozone-generators and tanks in which the ozone is absorbed by suitable substances in connection with these apparatuses, as specified.

3. In a plant for manufacturing ozone the combination of a dynamo with a rheostat, a mechanical current-interrupting device, induction-coils, cylinder-reservoirs, wash and drying bottles in connection with the reservoirs, ozone-generators in connection with the drying-bottles and in the secondary circuits of the induction-coils, and tanks in which the ozone is absorbed by suitable substances in connection with the ozone-generators as specified.

4. In a plant for manufacturing ozone the combination of a dynamo with a rheostat, a mechanical current-interrupting device, induction-coils, cylinder-reservoirs, gas wash and drying bottles in connection with the reservoirs ozone-generators in connection with the drying-bottles and in the secondary circuits of the induction-coils, tanks in which the ozone is absorbed by suitable substances in connection with the ozone-generators and a tank in which the unabsorbed excess of ozone is collected in connection with the absorption-tanks by a return-pipe, as described.

5. In a plant for manufacturing ozone and by-products the combination of a dynamo with a rheostat, induction-coils, cylinder-reservoirs, gas wash and drying bottles in connection with the reservoirs, ozone-generators in connection with the drying-bottles and in the secondary circuits of the induction-coils, apparatuses for separating and collecting the by-products in connection with the ozone-generators and tanks in which the ozone is absorbed in connection with these apparatuses, as specified.

In testimony whereof we have hereunto set our hands in the presence of two subscribing witnesses.

GUSTAF JOHANN ANDERSSON.
JULIUS CARL DITTRICH.

Witnesses:
B. VON HERFF,
A. CUMMINGS.